Jan. 30, 1934.  E. F. PRIETO  1,945,448
SEAL FOR SECURING WIRE AND CORD
Filed Dec. 8, 1932
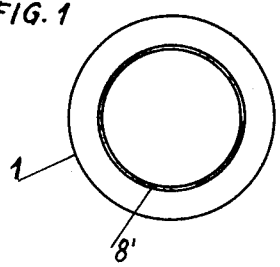
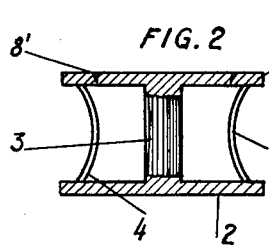
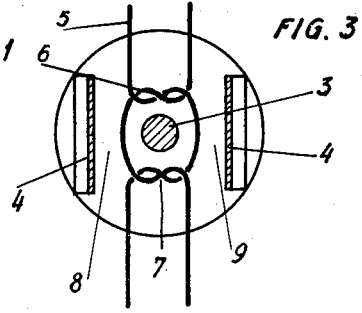
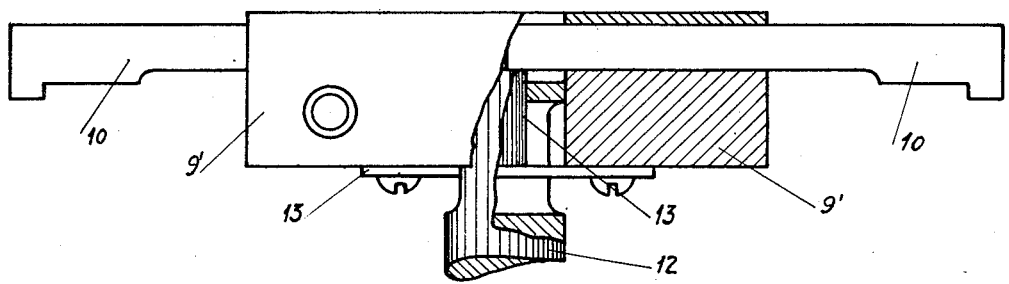
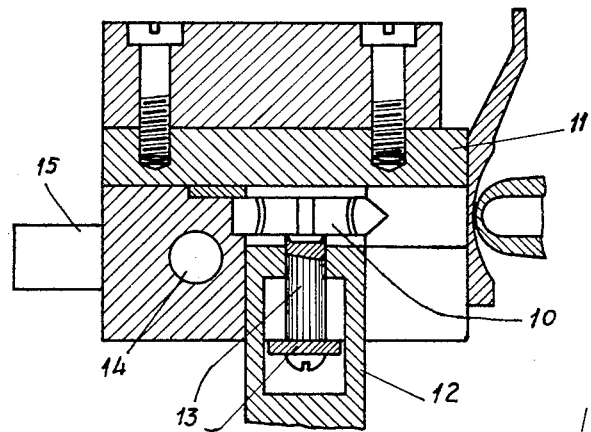
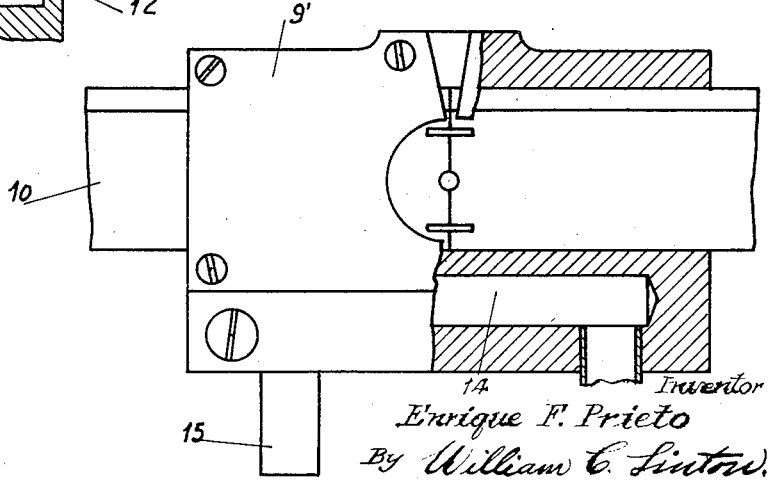
Inventor
Enrique F. Prieto
By William C. Linton.
Attorney.

Patented Jan. 30, 1934

1,945,448

UNITED STATES PATENT OFFICE 1,945,448

SEAL FOR SECURING WIRE AND CORD

Enrique Fernández Prieto, Barcelona, Spain

Application December 8, 1932. Serial No. 646,342

1 Claim. (Cl. 292—308)

The present invention refers to some improvements introduced into seals for securing wire and cord.

The seals to which these improvements relate, are those made in one piece, usually of lead or similar material, in the shape of a disc, with one or more channels parallel to its flat faces through which the wires or cords to be joined pass, the seal after their passage being crushed by a pair of pliers so that the wires or cords thus become secured.

In practice it happens that, even when the said seals close properly and with full power, it is quite possible to open them and withdraw the wires or cords retained. The efficacy is therefore very relative. Sometimes it is enough to give the seal a strong sharp pull, in the direction of the wire or cord, for it to slide all along them. This drawback has been overcome with the improvements introduced in such seals by the present invention.

In the accompanying drawing the seal is shown made with the said improvements and also the mold in which it is cast, as an example of one of the modes of manufacture.

In Fig. 1 one of the flat faces of the seal is represented; Fig. 2 is a vertical section and Fig. 3 a horizontal section of the seal. In Figs. 4, 5 and 6 are respectively shown: a longitudinal view, a transverse section and a plan of the mold or matrix to which reference has been made.

The seals made in accordance with the improvements we are dealing with are formed essentially of two discs 1 and 2, arranged parallel one to another, joined at the middle by a stem 3, either cylindrical or prismatic in form and at two diametrically opposite points by small plates or walls 4, curved towards the interior of the seal.

To use the seal the following operations are carried out:

After knotting, in the usual wire, the wire or cord securing the object to be sealed, sack, bale, packet or such like, ready to receive the seal, the two wires or cords coming from the knot 6 (Fig. 3) are passed through the spaces 8 and 9 and the seal is pressed against the said knot so that the knot touches the central stem 3. A second knot 7 is then made in the same wires, and tied over the central stem which thus binds it, the seal can no longer slide along the wires 5 and with matters thus arranged the seal is closed with the pliers, an operation which crushes the stem 3 and also closes by crushing the walls or plates 4, the two discs 1 and 2 uniting to form one only, leaving enclosed in the interior, firmly secured, the knots 6 and 7.

Furthermore, one of the discs, say the 1, has made in it a grove 8. The depth of this groove may vary, it may even go right through the disc, so as to form a weakened rim in the substance of the disc, inside the walls 4.

On closing the seal with the pliers, that is, when the discs 1 and 2 are crushed, the said groove 8 becomes closed, but it continues to exist in such a way that, if any attempt to separate the said discs is made, with any pointed object, a bending of the said discs will be produced and owing to the weakening of the rim of which mention has been made, a portion of same will chip off, the seal being thus spoilt and the attempt at violation of which it has been the object made evident.

With this seal there is no chance of its being able to slide along the wires or cords, owing to its fixture by knots to the central stem, which, as has been said, remains inside the seal once this is crushed or closed.

As regards the mold or matrix, shown in Figs. 4, 5 and 6, this consists of a body 9', which in a convenient and appropriate way is connected to the corresponding machine for casting seals, of any type already known. In this body 9' are placed some sliding pieces 10 capable of making contact one with another, and the ends by which said pieces make contact are shaped in such a way that they constitute the mold of the central stem 3 and of the lateral walls 4 of the seal, while the discs 1 and 2, are formed by the body itself 9' with the upper plate 11 and the ejector 12. Through the interior of this passes a fixed stem 13 whose upper end is that which determines the formation, in the corresponding disc of the seal, of the groove or cut 8 already mentioned. For the cooling of this mold and of the seals cast in it, a water circulating duct 14 is arranged with its corresponding inlet and outlet holes 15.

As has been already said, however, the mold described is only to be taken by way of an example, as the mode of manufacturing the seals we are dealing with may be varied absolutely as desired.

Again, the seals themselves may be of any shape and size, and the material of which they are made may be varied.

Having now particularly described and ascertained the nature of my said invention and in what manner the same is to be performed I declare that what I claim is:—

A seal for securing wire, cord or the like, said seal consisting of two substantially aligned, parallel spaced discs, a solid stem disposed substantially centrally of said discs, connected thereto and extending therebetween, said discs being further interconnected by two diametrically opposite walls, said walls being curved with the curvature directed inwardly, said walls being spaced from said central stem whereby to provide passages therebetween and said stem, at least one of said discs being provided with at least one groove in the outer surface thereof, whereby a line of weakness is produced in the substance of the disc.

ENRIQUE FERNÁNDEZ PRIETO.